(12) United States Patent
Creswell

(10) Patent No.: US 12,488,579 B2
(45) Date of Patent: Dec. 2, 2025

(54) ALIGNING ENTITIES USING NEURAL NETWORKS

(71) Applicant: DeepMind Technologies Limited, London (GB)

(72) Inventor: Antonia Phoebe Nina Creswell, London (GB)

(73) Assignee: DeepMind Technologies Limited, London (GB)

( * ) Notice: Subject to any disclaimer, the term of this patent is extended or adjusted under 35 U.S.C. 154(b) by 379 days.

(21) Appl. No.: 18/016,124

(22) PCT Filed: Jul. 16, 2021

(86) PCT No.: PCT/EP2021/070023
§ 371 (c)(1),
(2) Date: Jan. 13, 2023

(87) PCT Pub. No.: WO2022/013441
PCT Pub. Date: Jan. 20, 2022

(65) Prior Publication Data
US 2023/0260271 A1    Aug. 17, 2023

Related U.S. Application Data

(60) Provisional application No. 63/052,878, filed on Jul. 16, 2020.

(51) Int. Cl.
*G06V 10/00* (2022.01)
*G06V 10/82* (2022.01)
*G06V 20/58* (2022.01)

(52) U.S. Cl.
CPC .............. *G06V 10/82* (2022.01); *G06V 20/58* (2022.01); *G06V 2201/07* (2022.01)

(58) Field of Classification Search
CPC .... G06V 10/82; G06V 20/58; G06V 2201/07; G06F 18/2413
See application file for complete search history.

(56) References Cited

FOREIGN PATENT DOCUMENTS

CN        111258217 A  *  6/2020  ............ B60W 10/18

OTHER PUBLICATIONS

Piloto et al, Learning intuitive physics through objects, ICLR (Year: 2020).*

(Continued)

*Primary Examiner* — Xiao Liu
(74) *Attorney, Agent, or Firm* — Fish & Richardson P.C.

(57) ABSTRACT

Methods, systems, and apparatus, including computer programs encoded on computer storage media, for aligning entities across time. One of the methods includes obtaining respective current feature representations for each of a set of current entities that have been detected in an environment at a current time point; obtaining respective historical feature representations for each of a set of historical entities that have been detected in the environment at one or more earlier time points preceding the current time point; and processing an alignment input comprising (i) the respective historical feature representations for the set of historical entities and (ii) the current feature representations for the set of current entities using an alignment neural network to generate an alignment output that defines, for each of one or more of the current entities, a corresponding historical entity that is the same as the current entity.

24 Claims, 4 Drawing Sheets

(56) References Cited

OTHER PUBLICATIONS

Liu et al, End-to-end comparative attention networks for person re-identification, arXiv:1606.04404V2 (Year: 2017).*
Yang et al, Entity Alignment Algorithm Based on Dual-Attention and Incremental Learning Mechanism, IEEE Access ( vol. 7), Nov. 6 (Year: 2019).*
Vaswani et al, Attention Is All You Need, NIPS (Year: 2017).*
Burgess et al, Monet: Unsupervised scene decomposition and representation, arXiv preprint arXiv:1901.11390v1 (Year: 2019).*
Ma et al, Matching Descriptions to Spatial Entities Using a Siamese Hierarchical Attention Network, IEEE Access vol. 6, pp. 28064-28072 (Year: 2018).*
Andrychowicz et al., "Learning efficient algorithms with hierarchical attentive memory," CoRR, submitted on Feb. 9, 2016, arXiv:1602.03218, 10 pages.
Anonymous [online], "Wayback Machine", Retrieved on Aug. 10, 2021, Retrieved from URL <https://web.archive.org/web/2020*/https://openreview.net/pdf?id=H1gcw1HYPr>, 2 pages.
Baillargeon et al., "Object permanence in five-month-old infants," Cognition, Jan. 1, 1985, 20(3):191-208.
Bello et al., "Neural combinatorial optimization with reinforcement learning," CoRR, submitted on Nov. 29, 2016, arXiv:1611.09940, 15 pages.
Burgess, "Monet: Unsupervised scene decomposition and representation," CoRR, submitted on Jan. 22, 2019, arXiv:1901.11390, 22 pages.
Chang et al., "A compositional object-based approach to learning physical dynamics," CoRR, submitted on Dec. 1, 2016, arXiv:1612.00341, 15 pages.
Co-Reyes et al., "Discovering, predicting, and planning with objects," International Conference on Machine Learning Workshop, 2019, 7 pages.
Creswell et al, "AlignNet: Unsupervised entity alignment," CoRR, submitted on Jul. 21, 2020, arXiv preprint arXiv:2007.08973, 20 pages.
Creswell et al., "AlignNet: Self-supervised Alignment Module," ICLR 2020 Conference Blind Submission, Jul. 9, 2020, 24 pages.
Das et al, "Probing emergent semantics in predictive agents via question answering," CoRR, submitted on Jun. 1, 2020, arXiv:2006.01016, 16 pages.
Ferreira et al., "Learning visual dynamics models of rigid objects using relational inductive biases," CoRR, submitted on Sep. 9, 2019, arXiv:1909.03749, 8 pages.
Graves et al., "Neural turing machines," CoRR, submitted on Oct. 20, 2014, arXiv:1410.5401, 26 pages.
Greff et al., "Multi-object representation learning with iterative variational inference," International Conference on Machine Learning, May 24, 2019, pp. 2424-2433.
Greff et al., "Tagger: Deep unsupervised perceptual grouping," Proceedings of the 30th International Conference on Neural Information Processing Systems, Dec. 2016, pp. 4491-4499.
He et al., "Tracking by animation: Unsupervised learning of multi-object attentive trackers," Proceedings of the IEEE/CVF Conference on Computer Vision and Pattern Recognition, Jun. 15, 2019, pp. 1318-1327.
Hill et al., "Environmental drivers of systematicity and generalization in a situated agent," International Conference on Learning Representations, Dec. 2019, 15 pages.
Hill et al., "Human instruction-following with deep reinforcement learning via transfer-learning from text," CoRR, submitted on May 19, 2020, arXiv:2005.09382, 19 pages.
International Preliminary Report on Patentability in International Appln. No. PCT/EP2021/070023, mailed on Jan. 26, 2023, 9 pages.
International Search Report and Written Opinion in International Appln. No. PCT/EP2021/070023, mailed on Oct. 21, 2021, 15 pages.
Janner et al., "Reasoning about physical interactions with object-oriented prediction and planning," CoRR, submitted on Dec. 28, 2018, arXiv:1812.10972, 12 pages.
Kulkarni et al., "Unsupervised learning of object keypoints for perception and control," CoRR, submitted on Jun. 19, 2019, arXiv:1906.11883, 22 pages.
Li et al., "Object Re-Identification Based on Deep Learning," IntechOpen, Jun. 23, 2019, 23 pages.
Lyu et al., "AutoShuffleNet: Learning permutation matrices via an exact lipschitz continuous penalty in deep convolutional neural networks," Proceedings of the 26th ACM SIGKDD International Conference on Knowledge Discovery & Data Mining, Aug. 23, 2020, pp. 608-616.
Mena et al., "Learning latent permutations with gumbel-sinkhorn networks," CoRR, submitted on Feb. 23, 2018, arXiv:1802.08665, 22 pages.
Milan et al., "Data-driven approximations to NP-hard problems," Proceedings of the Thirty-First AAAI Conference on Artificial Intelligence, Feb. 12, 2017, 31(1):1453-1459.
Nash et al., "The multi-entity variational autoencoder," Proceedings of the 31st Conference on Neural Information Processing Systems, 2017, 8 pages.
Parisotto et al., "Neural map: Structured memory for deep reinforcement learning," CoRR, submitted on Feb. 27, 2017, arXiv:1702.08360, 13 pages.
Piloto et al., "Learning intuitive physics through objects," Bridging AI and Cognitive Science, 2020, 9 pages.
Piloto et al., "Probing physics knowledge using tools from developmental psychology," CoRR, submitted on Apr. 3, 2018, arXiv:1804.01128, 13 pages.
Pylyshyn, "The role of location indexes in spatial perception: A sketch of the FINST spatial-index model," Cognition, Jun. 1, 1989, 32(1):65-97.
Riochet et al., "Occlusion resistant learning of intuitive physics from videos," CoRR, submitted on Apr. 30, 2020, arXiv:2005.00069, 18 pages.
Smith et al., "Modeling expectation violation in intuitive physics with coarse probabilistic object representations," Proceedings of the 33rd International Conference on Neural Information Processing Systems, Dec. 2019, pp. 8983-8993.
Spelke et al., "Core knowledge," Developmental science, Jan. 2007, 10(1):89-96.
Valmadre et al., "End-to-end representation learning for correlation filter based tracking," Proceedings of the IEEE conference on computer vision and pattern recognition, Apr. 20, 2017, pp. 2805-2813.
Vaswani et al., "Attention is all you need," Proceedings of the 31st International Conference on Neural Information Processing Systems, Dec. 2017, pp. 6000-6010.
Veerapaneni et al., "Entity abstraction in visual model-based reinforcement learning," Conference on Robot Learning, May 12, 2020, pp. 1439-1456.
Vinyals et al., "Pointer networks," Advances in Neural Information Processing Systems, Dec. 2015, pp. 2692-2700.
Watters et al., "Cobra: Data-efficient model-based RL through unsupervised object discovery and curiosity-driven exploration," CoRR, submitted on May 22, 2019, arXiv:1905.09275, 24 pages.
Watters et al., "Spriteworld: A flexible, configurable reinforcement learning environment," Sep. 17, 2019, retrieved from URL: <https://github.com/deepmind/spriteworld/>, 6 pages.
Yang and A. B. Chan. Learning dynamic memory networks for object tracking. In Proceedings of the European Conference on Computer Vision, Oct. 2018, pp. 152-167.
Ye et al., "Deep learning for person re-identification: A survey and outlook," IEEE transactions on pattern analysis and machine intelligence, Jan. 26, 2021, 44(6):2872-2893.
Yi et al., "Clevrer: Collision events for video representation and reasoning," CoRR, submitted on Oct. 3, 2019, arXiv:1910.01442, 19 pages.
Yi et al., "Neural-Symbolic VQA: Disentangling reasoning from vision and language understanding," Advances in Neural Information Processing Systems, Oct. 2018, pp. 1031-1042.
Yoon et al., "Data association for multi-object tracking via deep neural networks," Sensors, Jan. 29, 2019, 19(3):559, 15 pages.
Zambaldi et al., "Relational deep reinforcement learning," CoRR, submitted on Jun. 5, 2018, arXiv:1806.01830, 15 pages.

(56) References Cited

OTHER PUBLICATIONS

Zhang et al., "A simple baseline for multi-object tracking," CoRR, arXiv:2004.01888, Apr. 2020, 17 pages.
Zhang et al., "FairMOT: On the fairness of detection and re-identification in multiple object tracking," International Journal of Computer Vision, Nov. 2021, 129:3069-3087.

* cited by examiner

ALIGNING ENTITIES USING NEURAL NETWORKS

CROSS-REFERENCE TO RELATED APPLICATIONS

This application is a National Stage Application under 35 U.S.C. § 371 and claims the benefit of International Application No. PCT/EP2021/070023, filed Jul. 16, 2021, which claims priority to U.S. Provisional Patent Application No. 63/052,878, filed on Jul. 16, 2020, the entire contents of which are hereby incorporated by reference.

BACKGROUND

This specification relates to processing image observations using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that aligns entities, e.g., objects, across multiple image observations of an environment using a neural network.

In one aspect there is described a computer implemented method, and a corresponding system configured to implement the method.

The method comprises obtaining respective current feature representations for each of a set of current entities that have been detected in an environment at a current time point; obtaining respective historical feature representations for each of a set of historical entities that have been detected in the environment at one or more earlier time points preceding the current time point; and processing an alignment input comprising (i) the respective historical feature representations for the set of historical entities and (ii) the current feature representations for the set of current entities using an alignment neural network to generate an alignment output that defines, for each of one or more of the current entities, a corresponding historical entity that is the same as the current entity.

In implementations the entities are e.g. objects in a scene, i.e. entities in an image of the environment. In implementations the environment is a real-world environment. In implementations the current and historical feature representations are representations of the entities e.g. objects, that may each be obtained at least in part by processing an image of the environment using a scene decomposition neural network. Thus the scene decomposition neural network may receive an observation comprising an image and process the observation to generate a decomposition output that decomposes the image into a plurality of regions and includes a respective feature representation for each of the regions. That is, obtaining respective current feature representations for each of the set of current entities may comprise processing an observation for the current time point using the scene decomposition neural network, and obtaining respective historical feature representations for each of the set of historical entities may comprise processing an observation for each of the one or more earlier time points using the scene decomposition neural network.

In implementations the method is used for tracking multiple entities, e.g. objects, in images obtained at the current and earlier time points. Thus in some implementations the method involves capturing images of the environment at the current and earlier time points, using the method to generate the alignment output, and providing data identifying an alignment of the entities across time.

As a particular example, the data identifying the alignment of the entities can include the current feature representations aligned according to the alignment output e.g. in what may be termed a canonical order, i.e. a consistent order over time. That is the alignment output defines, for each of the current entities, a consistent respective position in the canonical order.

Thus implementations provide a method of tracking multiple entities in a scene, which in general is a changing scene, whilst maintaining entity (object) persistence and identity. An output of such a method is a set of (current) feature representations each of which is consistently assigned to one of the tracked entities e.g. objects.

In general the feature representation may represent one or more features of an entity or object, such as size, shape, color, texture, position (e.g. in each dimension), and motion. Thus the system may be used to obtain information about one or more properties of one or more of the entities (objects).

As described above, implementations of the method operate in feature representation space which in general has a lower dimensionality than image pixel space, thus facilitating the tracking.

In implementations the alignment neural network comprises an attention-based neural network to generate the alignment output. Here an attention-based neural network is a neural network comprising an attention mechanism. In some implementations the attention-based neural network may repeatedly apply the attention mechanism to map the alignment input to the alignment output. In some implementations the attention-based neural network may apply the attention mechanism over the current feature representations and predicted feature representations to generate the alignment output. The attention mechanism may be a self-attention mechanism. The attention-based neural network may have a Transformer architecture i.e. it may have one or more transformer neural network layers each comprising a multi-head self-attention mechanism.

When the attention mechanism is applied to map the alignment input to the alignment output the historical feature representations may be stored in slots of a slot-based memory and the alignment output may define an assignment of each current entity to a different one of the slots. In a slot-based memory the memory may be organized as a set of slots in which each slot is configured to store a feature representation. The feature representation stored in each slot may be updated using the current feature representation of the current entity assigned to the slot by the assignment output, e.g. using a slot-specific neural network. When there are fewer entities than slots only a proper subset (in mathematical terms) of the slots in the slot-based memory may be assigned to represent one of the historical entities. In implementations using an entity-based (slot-based) memory creates an inductive bias for object persistence, which allows the model to better handle the reappearance of objects e.g. after short or long-term occlusion or after a temporary change in camera gaze.

When the attention mechanism is applied over the current feature representations and predicted feature representations, the predicted feature representations may be generated by processing a dynamics input comprising at least the historical feature representations using a dynamics neural network to generate a respective predicted feature representation for each of the set of historical entities that is predicted to characterize the historical entity at the current time point.

Particular embodiments of the subject matter described in this specification can be implemented so as to realize one or more of the following advantages.

Existing deep learning models can segment scenes into component objects without supervision. Unfortunately, while these models may provide excellent segmentation of a single frame, the models do not keep track of how objects segmented at one time-step correspond (or align) to those at a later time-step. That is, the models do not keep track of which object in one frame is the same as another object in another frame at a different time point. The alignment (or correspondence) problem has impeded progress towards using object or, more generally, entity representations generated by these models in down-steam tasks that require tracking an environment over multiple time points. Examples of such tasks include robot or other agent control tasks, where an agent is being controlled, e.g., based on outputs generated by a neural network, from observations of an environment captured by the agent or by other sensors in the environment, and object based planning.

This specification describes techniques for aligning entities across time, i.e., across image observations captured at different time points. By making use of these alignment outputs, the feature representations can be more effectively used for down-stream tasks. More specifically, because of the architecture of the described systems, alignment outputs can be accurately generated without supervision during training, i.e., without having access to information about ground truth alignments of entities during training. This allows the described techniques to be used in a wide range of environments where such supervision is not readily available.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
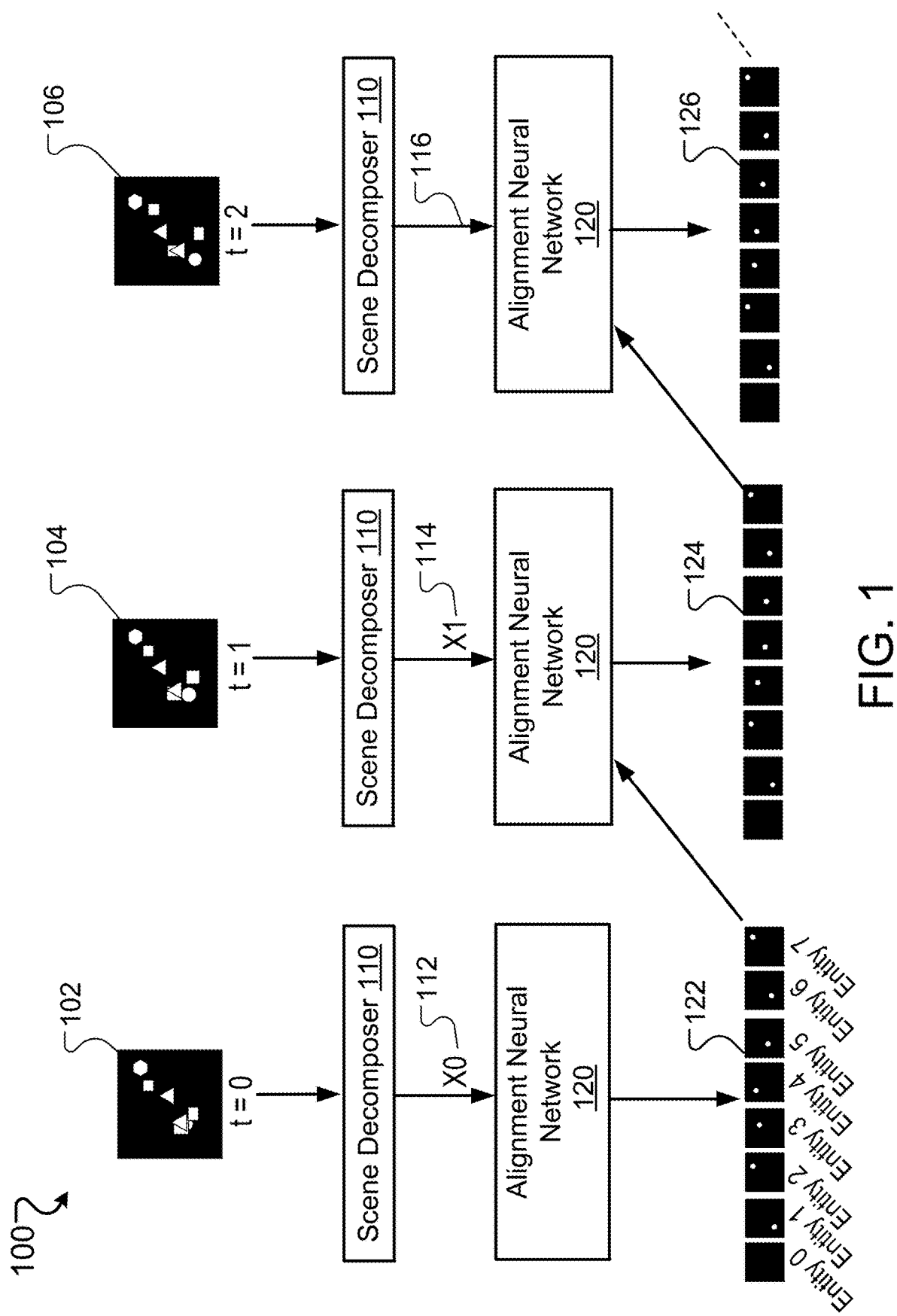
FIG. 1 shows an example entity alignment system.

FIG. 1 shows an example entity alignment system 100.

The entity alignment system 100 is an example of a system implemented as computer programs on one or more computers in one or more locations, in which the systems, components, and techniques described below can be implemented.

The entity alignment system 100 aligns entities, e.g., objects, across multiple image observations of an environment using an alignment neural network 120. In other words, the entity alignment system 100 determines, at each of multiple time points, which entities that have been detected in an image observation at the time point align with, i.e., are the same entity as, which entities that have been detected in image observations at earlier time points.

In particular, the system 100 receives a sequence of image observations of a scene in an environment that each correspond to a different time point. The image observations may be obtained from an image sensor such as a camera or LIDAR sensor, i.e. an image observation may comprise a point cloud.

For example, the sequence of image observations can be images captured by a camera sensor of a mechanical agent, e.g., a robot or an autonomous vehicle, navigating through the environment, e.g. the real-world environment, over time to complete a specified task, e.g., to reach a specified location in the environment, to move an object to a specified location in an environment, or to locate a specified objet in the environment. As another example, the sequence of image observations can be images captured by a camera sensor located in the environment, external to any agents navigating through the environment, e.g., mounted or otherwise statically positioned at a given location in the environment. The entities that are detected in a given image observation can include dynamic objects, static objects, or both. Dynamic objects can include e.g., other agents, cyclists, pedestrians, or animals. Static objects can include trees and other vegetation, signage, machinery, and so on.

The example of FIG. 1 shows the processing of the system 100 for three image observations 102, 104, and 106 at three different time points 0, 1, and 2, respectively.

At each time point, the system 100 detects entities that appear in the environment at the time point and generates a respective feature representation of each of the entities by processing the image observation at the time point using a scene decomposer 110 that decomposes the scenes into regions that each depict a different entity and generates a respective feature representation for each entity.

A feature representation, as used in this specification, is an ordered collection of numeric values, e.g., a vector of floating point or other numeric values, that has been determined to represent an entity.

The scene decomposer 110 can decompose the scene into regions that each depict a different entity using any of a variety of decomposition techniques.

For example, the scene decomposer 110 can be a scene decomposition neural network that is configured to process an image observation to generate a decomposition output that decomposes the image into a plurality of regions and includes a respective feature representation for each of the regions.

As a particular example, the scene decomposition neural network can have been trained through unsupervised learning.

Any of a variety of scene decomposition neural networks that have been trained through unsupervised learning can be used.

One example of such a scene decomposition neural network and technques for the unsupervised training are described in C. P. Burgess, L. Matthey, N. Watters, R. Kabra, I. Higgins, M. Botvinick, and A. Lerchner. Monet: Unsupervised scene decomposition and representation. arXiv preprint arXiv:1901.11390, 2019.

Another example of such a scene decomposition neural network and techniques for the unsupervised training are described in K. Greff, R. L. Kaufmann, R. Kabra, N. Watters, C. Burgess, D. Zoran, L. Matthey, M. Botvinick, and A. Lerchner. Multi-object representation learning with iterative variational inference. arXiv preprint arXiv: 1903.00450, 2019.

The scene decomposer 110 decomposes the image observation 102 into one set of regions, the image observation 104 into another set of regions, and the image observation 106 into a third set of regions.

However, the entities are not aligned across time, i.e., the system 100 does not have access to information indicating which entities at a current time point match, i.e., are the same entity as, other entities that have already been detected at other time points.

As a particular example, the sets of regions can be arranged in an order from left to right. However, there is not necessarily any correspondence between the entities in a given position in the order among different sets.

For example, there is no guarantee that the region in the first position in the order in the set for image observation 102 depicts the same entity as the region in the first position in the order in the set for image observation 104 or the set for the image observation 106. More specifically, for any given time point and for any given region in the set of regions for the time point, the system 100 does not have access to any information that specifies which regions in the sets of regions for any earlier time points depict the same entity as the given region.

In some cases, the scene decomposer 110 is configured to decompose each image observation into the same number of regions, but to associate any region that does not include an entity, i.e., in which no entity has been detected, with a placeholder feature representation that indicates that no entity was detected in the corresponding region. In other words, the set of entities that are detected at any given time point can include one or more placeholder entities that have a feature representation that indicates that no entity was detected in the corresponding region.

At each particular time point in the sequence after the first time point, the system 100 performs an alignment to predict, for each given entity of one or more of the entities detected in the image observation at the particular time point, which entity that has been detected at one or more earlier time points is the same entity as the given entity.

To perform the alignment at a current time point during the sequence, the system 100 obtains respective current feature representations X for each of a set of current entities that have been detected in the environment at the current time point, i.e., from the output of the scene decomposer 110 for the image observation at the current time point. Thus, the respective feature representations X can include a respective vector for each current entity in the set of current entities.

As shown in FIG. 1, the system 100 obtains current feature representations X0 112 at time point 0, current feature representations X1 114 at time point 1, and current feature representations 116 at time point 2.

The system 100 also obtains respective historical feature representations for each of a set of historical entities that have been detected in the environment at one or more earlier time points preceding the current time point. Generally, for every time point after the first point in the sequence, the historical feature representations have been generated as a result of the processing performed at the immediately preceding time point in the sequence. For the first time point in the sequence, the historical feature representations can be placeholder feature representations that indicate that no entities have yet been identified.

More specifically, in some implementations, the historical entities include only those entities that were aligned at the immediately preceding time point.

In some other implementations, the historical entities include any entities that have been detected at any of the earlier time points that precede the current time point in the sequence.

For each time point, the system 100 processes an alignment input that includes (i) the respective historical feature representations for the set of historical entities and (ii) the current feature representations for the set of current entities using the alignment neural network 120 to generate an alignment output, e.g., output 122, 146, or 126, that defines, for each of one or more of the current entities, a corresponding historical entity that is the same as the current entity. In other words, the alignment output defines, for each of one or more of the current entities, an alignment of the entity with one of the historical entities that is predicted to be the same entity as the current entity.

Generating the alignment output when the historical entities include only those entities that were aligned at the immediately preceding time point is described in more detail below with reference to FIG. 2.

Generating the alignment output when the historical entities include any entities that have been detected at any of the earlier time points that precede the current time point in the sequence is described in more detail below with reference to FIG. 3.

As a particular example, the system can assign each historical entity to a respective position in a canonical order over historical entities and the alignment output can define, for each of the current entities, a respective position in the canonical order. That is, at the first time point the system can assign each historical entity to one of the positions in the canonical order and can maintain that canonical order throughout the time points in the sequence.

In this example, the alignment output can include, for each current entity, a respective score for each of the positions in the canonical order. After training, the system 100 can use the respective scores to assign a different position in the canonical order to each current entity. If a given current entity is assigned to the same position in the canonical order as a historical entity, the system 100 has determined that the given current entity is the same entity as the given historical entity.

Optionally, the alignment input can include data indicating a position of each historical entity in the canonical order, i.e., in addition to the historical feature representation for the historical entity.

Once the alignment output has been generated, the system 100 can use the alignment output for any of a variety of purposes.

For example the alignment output, with or separately from the (current) feature representations, may be provided as an input to a control system configured to control actions of the agent in response to the input to perform a particular task while interacting with the environment. As previously mentioned the agent may be a mechanical agent performing physical actions in a real-world environment.

As one example, the system 100 can use the alignment output to control the agent in response to the image observation, i.e., to select an action to be performed by the agent in response to the image observation. For example, the system 100 can provide the correspondences defined by the alignment output and, optionally, the feature representations, as input to a policy that has been learned through reinforcement learning for controlling the agent to perform the specified task.

As yet another example, the system 100 can provide the alignment output as input to an object-based planning system that plans a future trajectory of the agent based on interactions of the agent with objects in the environment. For example the system 100 can predict the behavior of part of a robot, e.g. a robot arm, and can also predict how the it interacts with objects.

As yet another example, the system 100 can generate a user interface presentation that identifies the correspondences indicated by the alignment output and provide the user interface presentation for presentation to a user device for presentation to a user. For example such a presentation may track or predict motion of one or more of the entities over time.

Figure 2:
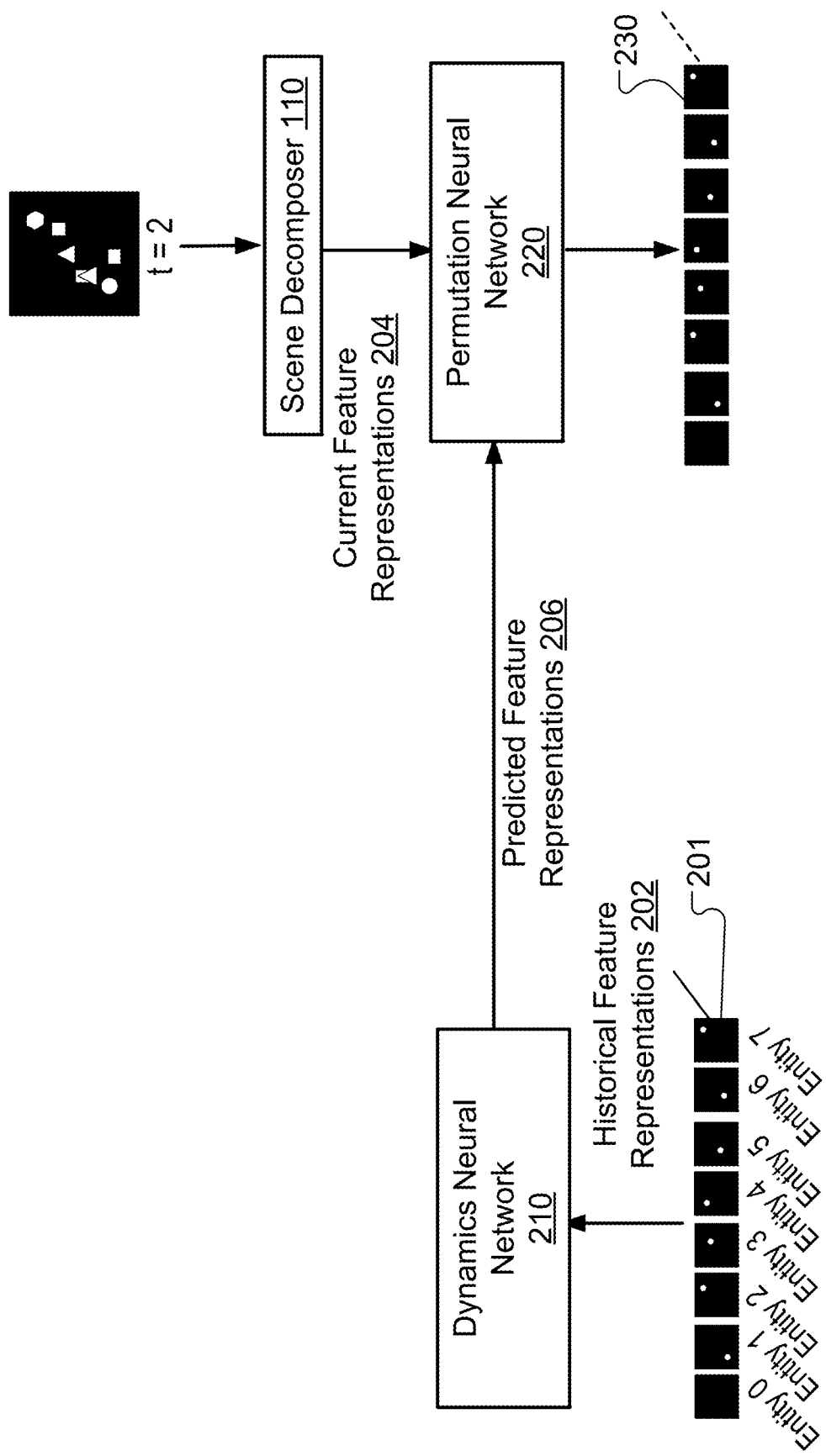
FIG. 2 shows an example of the operation of the alignment neural network at a given time point when the historical entities include only those entities that were aligned at the immediately preceding time point.

FIG. 2 shows an example of the operation of the alignment neural network 120 at a given time point when the historical entities include only those entities that were aligned at the immediately preceding time point.

That is, at the given time point, the alignment neural network 120 receives a respective historical feature representation 202 for the historical entities 201 that were aligned at the immediately preceding time point and a respective current feature representation 204 for each current entity that was detected at the given time point.

As a particular example, the environment can be a fully observable environment in which all of the entities that can appear at any time point are observable at all of the time points. Thus, in a fully observable environment, at any given time point, each current entity corresponds to, i.e., is the same object as, exactly one of the historical entities that were aligned at the immediately preceding time point.

In the example of FIG. 2, the alignment neural network 120 includes a dynamics neural network 210 and a permutation neural network 220.

To perform the alignment at the given time point, the system processes a dynamics input that includes at least the historical feature representations 202 using the dynamics neural network 210 to generate a respective predicted feature representation 206 for each of the set of historical entities that is predicted to characterize the historical entity at the current time point.

More specifically, the dynamics neural network 210 is configured to process the dynamics input to generate an output that defines a respective update for each of the historical feature representations 202, i.e., a prediction of how the historical feature representation 202 will change from the preceding time point to the given time point, e.g., due to the dynamics of the environment.

The system then generates the respective predicted feature representation 206 for each of the set of historical entities by applying, e.g., adding, the respective update for the historical feature representation for the historical entity to the historical feature representation 202 for the historical entity.

As a particular example, the respective update for each of the historical feature representations 202 can be one or more parameters of a distribution over possible updates. For example, the distribution over possible updates can be a Gaussian distribution, and the output of the dynamics neural network 210 can include the mean and, optionally, the standard deviation of the Gaussian distribution for each of the historical entities. To determine the update for a given historical entity, the system can either set the update equal to the mean of the distribution for the historical entity or sample an update from the distribution for the historical entity that is defined by the output of the dynamics neural network 210.

In some cases, in order to incorporate information from more than just the more recent time step, the dynamics neural network 210 can be a recurrent neural network. A recurrent neural network is a neural network that includes one or more recurrent neural network layers, e.g., long short-term memory (LSTM) neural network layers or gated recurrent unit (GRU) neural network layers, and, optionally, one or more other types of layers, e.g., one or more of self-attention layers, fully-connected layers, convolutional layers, and so on. In these cases, the dynamics input at a given time step also includes the internal state of the recurrent neural network as of the given time step and the dynamics neural network 210 updates the internal state as part of generating the output for the given time step.

In some cases, when the alignment outputs generated by the alignment neural network 120 are used to control an agent, the dynamics input can also include data identifying the action performed by the agent at the preceding time point. For example the action may be a "head turn", i.e. a change in image sensor gaze direction, which can lead to objects moving in and out of view.

Once the system has generated the respective predicted feature representations 206 for the set of historical entities, the system processes (i) the respective predicted feature representations 206 for the set of historical entities and (ii) the respective current feature representations 204 for the set of current entities using the permutation neural network 220 to generate the alignment output, i.e., the output that defines, for each of one or more of the current entities, a corresponding historical entity that is the same as the current entity.

The alignment output includes, for each historical entity, a respective score for each of the current entities.

After training, the system can map the respective scores to a "hard" alignment 230 that assigns a different historical entity to each current entity, e.g., by applying the Hungarian algorithm or by selecting the argmax current entity for each historical entity with the constraint that the system cannot select the same current entity for two different historical entities. Thus, after training, the system identifies a different historical entity for each current entity as the corresponding historical entity for the current entity.

During training, the system can map the respective scores to a "soft" alignment that specifies a soft approximation of a permutation matrix, e.g., by applying the Sinkhorn algorithm or another differentiable algorithm that generates a respective probability distribution over the current entities for each historical entity.

Generally, the permutation neural network 220 is an attention-based neural network that applies an attention mechanism over the predicted feature representations 206 and the current feature representations 204 to generate the respective scores for each of the current entities.

As a particular example, the permutation neural network 220 can have a Transformer architecture that includes a sequence of one or more self-attention blocks.

In general an attention mechanism maps a query and a set of key-value pairs to an output computed as a weighted sum of the values, where the weight assigned to each value is computed by a compatibility or similarity function of the query with the corresponding key. The query, keys, and values are all vectors and each may be derived by transforming an object e.g. a feature representation or set of feature representations into a respective vector e.g. using a learned linear transform. The attention mechanism may be a self-attention mechanism in which case the query and the set of key-value pairs are all derived from the set of input objects i.e. input feature representations. The attention-based neural network may have a Transformer architecture (Vaswani et al. "Attention is all you need").

As described above, prior to using the alignment neural network 120 to align entities, a training system, i.e., the same system as or a different system from the system that uses the alignment neural network 120 after training, trains the alignment neural network 120, e.g. through unsupervised learning, in order to cause the alignment neural network 120 to accurately align entities. That is, the training system trains the alignment neural network 120 to provide a trained alignment neural network 120. Thus the example of FIG. 2 includes a trained dynamics neural network 210 and a trained permutation neural network 220.

When, as in the example of FIG. 2, the alignment neural network 120 includes the dynamics neural network 210 and the permutation neural network 220, the training system trains the dynamics neural network 210 and the permutation neural network 220. The dynamics neural network 210 and the permutation neural network 220 may be trained jointly e.g. through unsupervised learning to minimize an unsupervised loss.

More specifically, the unsupervised loss includes a first term that measures a difference, e.g., the mean squared error or other element-wise loss, between the i) the predicted (historical) feature representations 206 for the set of historical entities that are generated using the dynamics neural network 210 and (ii) aligned current feature representations generated by applying the alignment output generated by the permutation neural network 220 to the respective current feature representations 204 for the set of current entities. As described above, during training the alignment is a "soft" alignment. Thus, the training system can generate the aligned current feature representations by, for each historical entity, computing a weighted sum of the current feature representations weighted according to the probability distribution for the historical entity in the alignment output.

Optionally, the unsupervised loss can also include one or more additional terms.

For example, the unsupervised loss can include a second term that is based on an entropy of the alignment output. For example, the second term can be equal to or directly proportional to the entropy of the soft approximation of the permutation matrix.

As another example, the unsupervised loss can also include a third term that is dependent on (i) a divergence, e.g., a KL divergence or other divergence measure, between the distribution over possible updates defined by the output of the dynamics neural network 210 and (ii) a prior distribution over possible updates. The training system can use any appropriate fixed distribution as the prior distribution over possible updates, e.g., a uniform distribution or a Gaussian distribution with fixed mean and standard deviation.

Thus, because, as described above, the scene decomposer can also be trained through unsupervised learning, the training system can "learn" to align objects across time entirely through unsupervised learning and without any ground truth information about object alignments across time.

Figure 3:
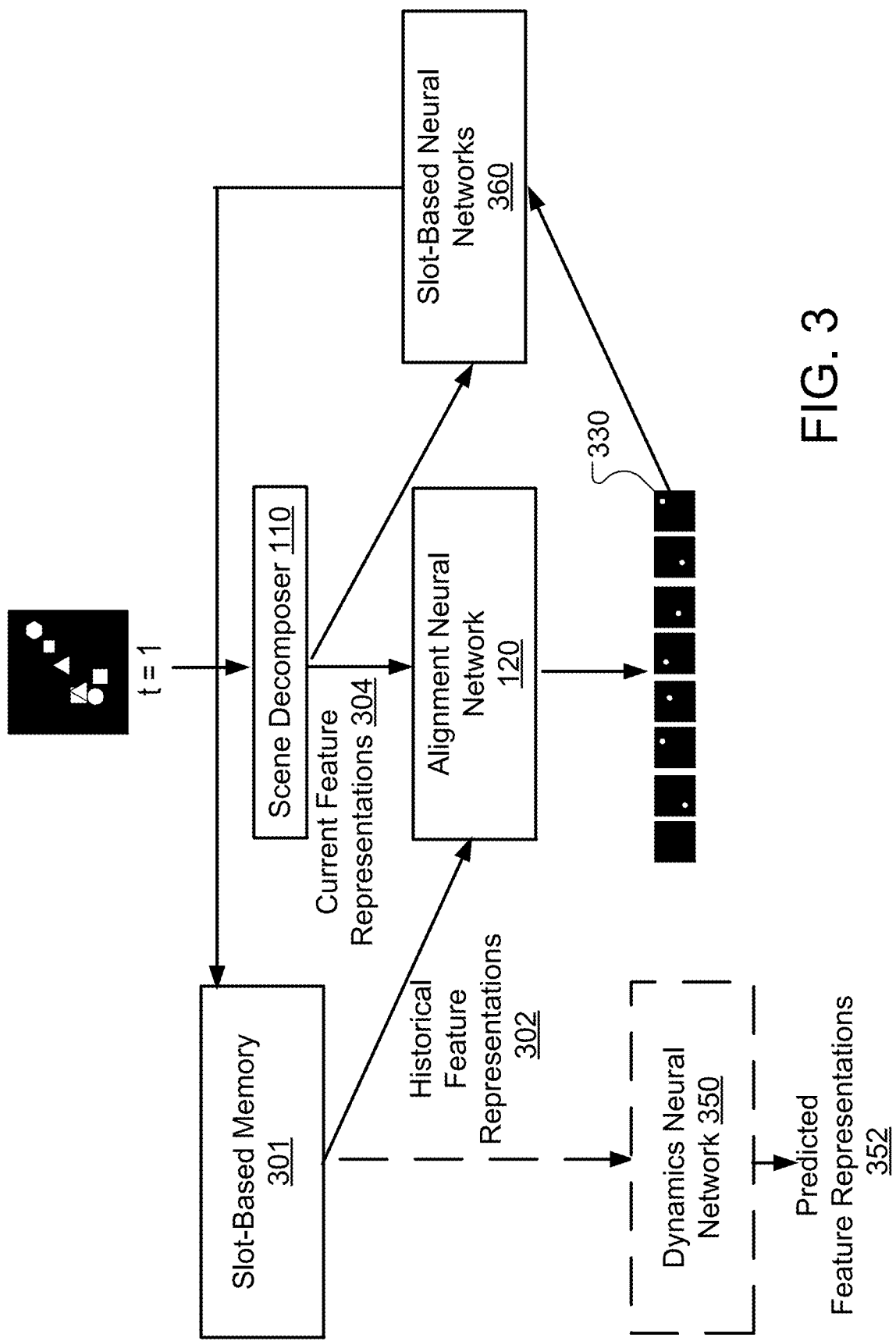
FIG. 3 shows an example of the operation of the alignment neural network 120 at a given time point when the historical entities include any entities that have been detected at any of the earlier time points that precede the given time point in the sequence.

FIG. 3 shows an example of the operation of the alignment neural network 120 at a given time point when the historical entities include any entities that have been detected at any of the earlier time points that precede the given time point in the sequence.

As a particular example, the environment can be a partially observable environment, in which an entity that is detected at one time point may not be detected at another time point, e.g., because the entity is not in the field of view of the camera that captures the image observations at the other time point, because the entity is occluded by another entity at the other time point, or is not able to be detected in the image observation at the other time point for another reason.

In the example of FIG. 3, the historical entities are represented as slots in a slot-based memory 301, i.e., a memory that has a plurality of "slots" and that stores data for each of the slots, and the historical feature representations 302 are feature representations that are stored in the slots of the slot-based memory 301. That is, each unique historical entity that has been detected at any preceding time point is assigned to a different one of the slots in the slot-based memory and the feature representation stored in a given slot is the feature representation of the historical entity that has been assigned to the given slot.

In this case, the alignment input includes (i) respective historical feature representations 302 for each of the slots in the slot-based memory and (ii) current feature representations 304 for the set of current entities. For slots to which no historical entity is assigned, the respective historical feature representation is a placeholder feature representation that indicates that no entity has been assigned to the slot, e.g., the same placeholder feature representation that is generated by the scene decomposer for regions that do not depict an entity.

Similarly, the alignment output defines an assignment of each current entity to a different one of the slots in the slot-based memory. That is, when the system determines that a given current entity is the same entity as a given one of the historical entities, the system assigns the given current entity to the same slot to which the given historical entity is assigned. When the system determines that a given current entity is a new entity, i.e., is a different entity from all of the historical entities that have previously been detected, the system assigns the given current entity to a new slot in the slot-based memory that is not currently assigned to any of the historical entities.

More specifically, the alignment output includes, for each memory slot, a respective score for each of the current entities.

After training, the system can map the respective scores to a "hard" alignment 330 that assigns a different memory slot to each current entity, e.g., by applying the Hungarian algorithm or by selecting the argmax current entity for each slot with the constraint that the system cannot select the same current entity for two different slots.

During training, the system can map the respective scores to a "soft" alignment that specifies a soft approximation of a permutation matrix, e.g., by applying the Sinkhorn algorithm or another differentiable algorithm that generates a respective probability distribution over the current entities for each memory slot.

In the example of FIG. 3, the alignment neural network 120 is an attention-based neural network that repeatedly applies an attention mechanism to map the alignment input to the alignment output. As a particular example, the attention-based neural network has a Transformer architecture.

In general an attention mechanism maps a query and a set of key-value pairs to an output computed as a weighted sum of the values, where the weight assigned to each value is computed by a compatibility or similarity function of the query with the corresponding key. The query, keys, and values are all vectors and each may be derived by transforming an object e.g. a feature representation or set of feature representations into a respective vector e.g. using a learned linear transform. The attention mechanism may be a self-attention mechanism in which case the query and the set of key-value pairs are all derived from the set of input objects i.e. input feature representations. The attention-based neural network may have a Transformer architecture (Vaswani et al. "Attention is all you need").

In some cases, when the alignment outputs generated by the alignment neural network 120 are used to control an agent, the alignment input can also include data identifying the action performed by the agent at the preceding time point.

After training, once the system has assigned each current entity to a slot in the slot-based memory, the system updates the feature representation stored in each of the slots using the current feature representation of the current entity assigned to the slot by the assignment output. During training, the system determines the current feature representation of the current entity assigned to the slot by, for each memory slot, computing a weighted sum of the current feature representations weighted according to the probability distribution for the memory slot in the alignment output.

In particular, the system can, for each particular slot to which one of the current entities has been assigned, process the current feature representation of the current entity assigned to the slot by the assignment output using a slot-specific neural network 360, i.e., a neural network that is specific to the particular slot, to update the feature representation stored in the particular slot.

As a particular example, each slot-specific neural network 360 can be a recurrent neural network with the same architecture, but an independent internal state. Thus, the system can maintain a separate internal state for each of the slots in the slot-based memory and, for each particular slot, can process the current feature representation of the current entity assigned to the slot by the assignment output and the internal state for the particular slot to update the historical feature representation and to update the internal state for the particular slot. In implementations each slot-specific neural network 360 may have the same weights.

For slots to which none of the current entities are assigned by the alignment output, the system can either (i) refrain from updating the feature representation for the slot or (ii) process a placeholder current feature representation that indicates that no entity was assigned to the slot to update feature representation for the slot.

As described above, prior to using the alignment neural network 120 to align entities, a training system, i.e., the same system as or a different system from the system that uses the alignment neural network 120 after training, trains the alignment neural network 120, e.g. through unsupervised learning, in order to cause the alignment neural network 120 to accurately align entities. Thus the example of FIG. 3 includes a trained alignment neural network 120, and trained slot-specific neural network(s) 360.

In the example of FIG. 3, during training, the training system also makes use of a dynamics neural network 350.

The dynamics neural network 350 is a neural network that is configured to process a dynamics input that includes the historical feature representations for at least a portion of the historical entities, e.g., the historical feature representations for the slots in the memory to which an entity has been assigned, to generate a respective predicted feature representation 352 for each of the at least the portion of the historical entities that is predicted to characterize the historical entity at the current time point.

More specifically, the dynamics neural network 350 is configured to process the dynamics input to generate an output that defines a respective update for each of the historical feature representations, i.e., a prediction of how the historical feature representation will change from the preceding time point to the given time point, e.g., due to the dynamics of the environment.

The system then generates the respective predicted feature representation for each of the set of historical entities by applying, e.g., adding, the respective update for the historical feature representation for the historical entity to the historical feature representation for the historical entity.

As a particular example, the respective update for each of the historical feature representations can be one or more parameters of a distribution over possible updates. For example, the distribution over possible updates can be a Gaussian distribution, and the output of the dynamics neural network 350 can include the mean and, optionally, the standard deviation of the Gaussian distribution for each of the historical entities. To determine the update for a given historical entity, the system can either set the update equal to the mean of the distribution for the historical entity or sample an update from the distribution for the historical entity that is defined by the output of the dynamics neural network 350.

In some cases, in order to incorporate information from more than just the more recent time step, the dynamics neural network 350 can be a recurrent neural network. In these cases, the dynamics input at a given time step also includes the internal state of the recurrent neural network as of the given time step and the dynamics neural network 350 updates the internal state as part of generating the output for the given time step.

In some cases, when the alignment outputs generated by the alignment neural network 120 are used to control an agent, the dynamics input can also include data identifying the action performed by the agent at the preceding time point.

During training, the training system trains the dynamics neural network 350, the alignment neural network 120, and the slot-specific neural network(s) 360 jointly through unsupervised learning to minimize an unsupervised loss.

More specifically, the unsupervised loss includes a first term that measures a difference, e.g., a mean squared error or other element-wise loss, between the i) the predicted (historical) feature representations for the set of historical entities generated by the dynamics neural network 350 and (ii) aligned current feature representations generated by applying the alignment output generated by the alignment neural network 120 to the respective current feature representations for the set of current entities. As described above, during training the alignment is a "soft" alignment. Thus, the training system can generate the aligned current feature representations by, for each memory slot, computing a weighted sum of the current feature representations weighted according to the probability distribution for the memory slot in the alignment output.

Optionally, the unsupervised loss can also include one or more additional terms.

For example, the unsupervised loss can include a second term that is based on i.e. dependent upon an entropy of the alignment output. For example, the second term can be equal to or more generally directly proportional to the entropy of the approximation of the permutation matrix.

As another example, the unsupervised loss can also include a third term that is dependent on (i) a divergence between the distribution over possible updates defined by the output of the dynamics neural network 210 and (ii) a prior distribution over possible updates. The training system can use any appropriate fixed distribution as the prior distribution over possible updates, e.g., a uniform distribution or a Gaussian distribution with fixed mean and standard deviation.

Figure 4:
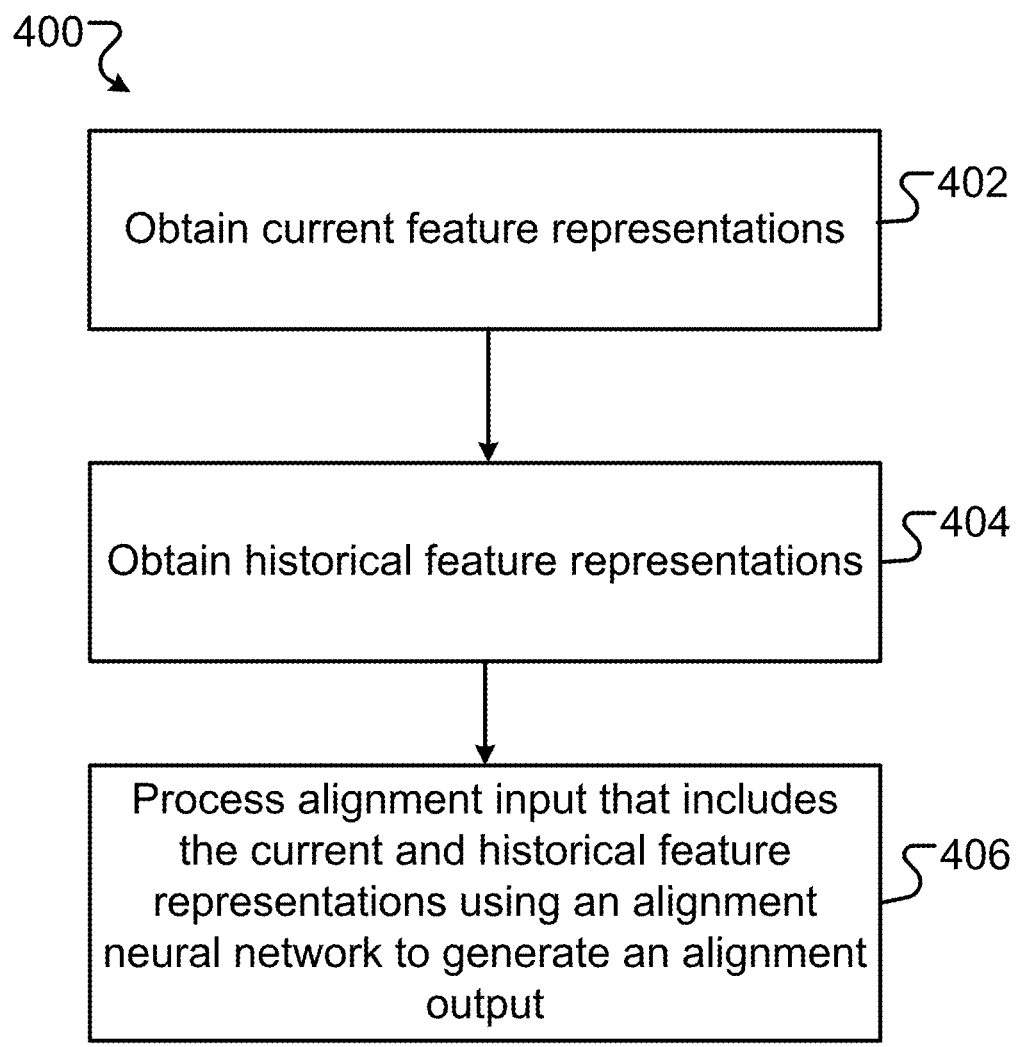
FIG. 4 is a flow diagram of an example process for generating an alignment output at a given time point.

FIG. 4 is a flow diagram of an example process 400 for generating an alignment output at a given time point. For convenience, the process 400 will be described as being performed by a system of one or more computers located in one or more locations. For example, an alignment system, e.g., the alignment system 100 of FIG. 1, appropriately programmed in accordance with this specification, can perform the process 400.

The system can perform the process 400 at each given time point in a sequence of time points to repeatedly generate alignment outputs for each time point in the sequence.

The system obtains respective current feature representations for each of a set of current entities that have been detected in the environment at the given time point (step 402). For example, the system can process the image observation at the given time point using a scene decomposer or obtain an output from the scene decomposer.

The system obtains respective historical feature representations for each of a set of historical entities that have been detected in the environment at one or more earlier time points preceding the current time point (step 404). In some implementations, the historical entities include only those entities that were aligned at the immediately preceding time point. In some other implementations, the historical entities include any entities that have been detected at any of the earlier time points that precede the current time point in the sequence.

The system processes an alignment input that includes (i) the respective historical feature representations for the set of historical entities and (ii) the current feature representations for the set of current entities using an alignment neural network to generate an alignment output that defines, for each of one or more of the current entities, a corresponding historical entity that is the same as the current entity (step 406). One example of the processing of the alignment neural network is described above with reference to FIG. 2. Another example of the processing of the alignment neural network is described above with reference to FIG. 3.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MIXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining respective current feature representations for each of a set of current entities that have been detected in an environment at a current time point;
obtaining respective historical feature representations for each of a set of historical entities that have been detected in the environment at one or more earlier time points preceding the current time point; and
processing an alignment input comprising (i) the respective historical feature representations for the set of historical entities and (ii) the current feature representations for the set of current entities using an alignment neural network to generate an alignment output that defines, for each current entity of one or more of the current entities, a corresponding historical entity that is the same as the current entity, wherein the alignment neural network includes a dynamics neural network and a permutation neural network and wherein processing the alignment input comprises:
processing a dynamics input comprising at least the historical feature representations using the dynamics neural network to generate a respective predicted feature representation for each of the set of historical entities that is predicted to characterize the historical entity at the current time point; and
processing (i) the respective predicted feature representations for the set of historical entities and (ii) the respective current feature representations for the set of current entities using the permutation neural network to generate the alignment output that defines, for each of one or more of the current entities, a corresponding historical entity that is the same as the current entity.

2. The method of claim 1, wherein the dynamics neural network is configured to generate an output defining a respective update for each of the historical feature representations; and
wherein generating the respective predicted feature representations comprises applying the respective updates to each of the historical feature representations.

3. The method of claim 2, wherein the output defining the respective update is one or more parameters of a distribution over possible updates.

4. The method of claim 1, wherein the dynamics neural network is a recurrent neural network.

5. The method of claim 1, wherein the permutation neural network is an attention-based neural network that applies an attention mechanism over the predicted feature representations and the current feature representations to generate the alignment output.

6. The method of claim 5, wherein the permutation neural network has a Transformer architecture.

7. The method of claim 1, wherein the historical entities are the entities that were detected at an immediately preceding time point.

8. The method of claim 1, wherein the alignment neural network is an attention-based neural network that repeatedly applies an attention mechanism to map the alignment input to the alignment output.

9. The method of claim 8 wherein the attention-based neural network has a Transformer architecture.

10. The method of claim 8, wherein the alignment input includes data indicating a position of each historical entity in a canonical order.

11. The method of claim 1, wherein the set of historical entities are represented as slots in a slot-based memory, wherein the historical feature representations are feature representations stored in the slots of the slot-based memory, and wherein the alignment output defines an assignment of each current entity to a different one of the slots in the slot-based memory.

12. The method of claim 11, further comprising:
for each slot of the slot-based memory, updating the feature representation stored in the slots using the current feature representation of the current entity assigned to the slot by the assignment output.

13. The method of claim 12, wherein the updating comprises processing the current feature representation using a slot-specific neural network.

14. The method of claim 13, wherein each slot-specific neural network is a recurrent neural network.

15. The method of claim 11, further comprising:
processing a dynamics input comprising the historical feature representations for at least a portion of the historical entities using a dynamics neural network to generate a respective predicted feature representation for each of at least a portion of the historical entities that is predicted to characterize the historical entity at the current time point.

16. The method of claim 15, wherein the dynamics neural network is configured to generate an output defining a respective update for each of the historical feature representations; and
wherein generating the respective predicted feature representations comprises applying the respective updates to each of the historical feature representations.

17. The method of claim 16, wherein the output defining the respective update is one or more parameters of a distribution over possible updates.

18. The method of claim 15, wherein the dynamics neural network is a recurrent neural network.

19. The method of claim 1, wherein each historical entity has been assigned a respective position in a canonical order, and wherein the alignment output defines, for each of the current entities, a respective position in the canonical order.

20. The method of claim 19, wherein the alignment output includes, for each current entity, a respective score for each of the positions in the canonical order.

21. The method of claim 1, wherein the permutation neural network also processes data indicating a position of each historical entity in a canonical order.

22. The method of claim 1, wherein the alignment neural network and the permutation neural network are different.

23. A system comprising one or more computers and one or more storage devices storing instructions that when executed by the one or more computers cause the one or more computers to perform operations comprising:
obtaining respective current feature representations for each of a set of current entities that have been detected in an environment at a current time point;
obtaining respective historical feature representations for each of a set of historical entities that have been detected in the environment at one or more earlier time points preceding the current time point; and
processing an alignment input comprising (i) the respective historical feature representations for the set of historical entities and (ii) the current feature representations for the set of current entities using an alignment neural network to generate an alignment output that defines, for each current entity of one or more of the current entities, a corresponding historical entity that is the same as the current entity, wherein the alignment neural network includes a dynamics neural network and a permutation neural network and wherein processing the alignment input comprises:

processing a dynamics input comprising at least the historical feature representations using the dynamics neural network to generate a respective predicted feature representation for each of the set of historical entities that is predicted to characterize the historical entity at the current time point; and processing (i) the respective predicted feature representations for the set of historical entities and (ii) the respective current feature representations for the set of current entities using the permutation neural network to generate the alignment output that defines, for each of one or more of the current entities, a corresponding historical entity that is the same as the current entity.

24. One or more non-transitory computer-readable storage media storing instructions that when executed by one or more computers cause the one or more computers to perform operations comprising:

obtaining respective current feature representations for each of a set of current entities that have been detected in an environment at a current time point;

obtaining respective historical feature representations for each of a set of historical entities that have been detected in the environment at one or more earlier time points preceding the current time point; and processing an alignment input comprising (i) the respective historical feature representations for the set of historical entities and (ii) the current feature representations for the set of current entities using an alignment neural network to generate an alignment output that defines, for each current entity of one or more of the current entities, a corresponding historical entity that is the same as the current entity, wherein the alignment neural network includes a dynamics neural network and a permutation neural network and wherein processing the alignment input comprises:

processing a dynamics input comprising at least the historical feature representations using the dynamics neural network to generate a respective predicted feature representation for each of the set of historical entities that is predicted to characterize the historical entity at the current time point; and processing (i) the respective predicted feature representations for the set of historical entities and (ii) the respective current feature representations for the set of current entities using the permutation neural network to generate the alignment output that defines, for each of one or more of the current entities, a corresponding historical entity that is the same as the current entity.

* * * * *